(12) United States Patent
Haider et al.

(10) Patent No.: US 12,037,520 B2
(45) Date of Patent: Jul. 16, 2024

(54) FLEXIBLE POLYUREAS FOR FLEXIBLE PACKAGING ADHESIVE WITHOUT AROMATIC AMINE MIGRATION

(71) Applicant: Covestro LLC, Pittsburgh, PA (US)

(72) Inventors: Karl W. Haider, Wexford, PA (US); Raymond Zeliznik, Bradford Woods, PA (US); Philip Jones, Gibsonia, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 18/335,301

(22) Filed: Jun. 15, 2023

(65) Prior Publication Data

US 2023/0323169 A1 Oct. 12, 2023

Related U.S. Application Data

(62) Division of application No. 16/987,503, filed on Aug. 7, 2020, now abandoned.

(60) Provisional application No. 62/884,205, filed on Aug. 8, 2019.

(51) Int. Cl.
| | | |
|---|---|---|
| *C09J 175/02* | (2006.01) | |
| *B32B 7/12* | (2006.01) | |
| *B32B 15/09* | (2006.01) | |
| *B32B 15/20* | (2006.01) | |
| *B32B 27/32* | (2006.01) | |
| *B32B 27/36* | (2006.01) | |
| *C08G 18/10* | (2006.01) | |
| *C08G 18/60* | (2006.01) | |
| *C08G 18/73* | (2006.01) | |

(52) U.S. Cl.
CPC .............. *C09J 175/02* (2013.01); *B32B 7/12* (2013.01); *B32B 15/09* (2013.01); *B32B 15/20* (2013.01); *B32B 27/32* (2013.01); *B32B 27/36* (2013.01); *C08G 18/10* (2013.01); *C08G 18/603* (2013.01); *C08G 18/73* (2013.01); *B32B 2307/546* (2013.01); *B32B 2439/70* (2013.01)

(58) Field of Classification Search
CPC ... C08G 18/6423; C08G 18/325; C08G 18/48
See application file for complete search history.

(56) References Cited

U.S. PATENT DOCUMENTS

| | | | |
|---|---|---|---|
| 3,169,949 A | 2/1965 | Buning | |
| 6,355,829 B2 | 3/2002 | Roesler et al. | |
| 7,754,782 B2 | 7/2010 | Heckroth et al. | |
| 8,119,245 B2 | 2/2012 | Kendi et al. | |
| 9,499,654 B2 | 11/2016 | Nakao et al. | |
| 2006/0011295 A1* | 1/2006 | Danielmeier | C08G 18/6651 156/330.9 |
| 2008/0058468 A1* | 3/2008 | Younes | C08G 18/482 524/589 |
| 2014/0357828 A1 | 12/2014 | Eggert et al. | |
| 2016/0024339 A1* | 1/2016 | Squiller | C08G 18/3821 524/589 |
| 2016/0083593 A1* | 3/2016 | Marauska | C08G 18/6423 521/163 |
| 2020/0010723 A1 | 1/2020 | Takeno | |

FOREIGN PATENT DOCUMENTS

| | | | | |
|---|---|---|---|---|
| CN | 107216842 A | 9/2017 | | |
| CN | 107522845 A | 12/2017 | | |
| CN | 110256996 A | * 9/2019 | | C09J 11/04 |
| CN | 110591533 A | 12/2019 | | |
| CN | 111410919 A | 7/2020 | | |
| JP | H11246646 A | 9/1999 | | |
| JP | 2014005364 A | 1/2014 | | |
| WO | 2020154320 A1 | 7/2020 | | |

OTHER PUBLICATIONS

Johnson, Randy A.; Ashland Performance Materials; "New Fast Curing Aliphatic Laminating Adhesives Reduce Waste and Energy Consumption"; 2008 AIMCAL Fall Technical Conference; Oct. 19-22, 2008, Myrtle Beach, SC.

Wuehrer et al. Polaspartic Coating, PDA Europe Conference, Vienna, Nov. 2008.

\* cited by examiner

*Primary Examiner* — Michael M Dollinger

(74) *Attorney, Agent, or Firm* — John E. Mrozinski, Jr.; Jed C. Benson; Richard P. Bender

(57) ABSTRACT

Provided is an adhesive comprising a reaction product of (A) an aliphatic polyisocyanate having a molecular weight of from 132 to 700; and (B) a polyaspartate comprising a reaction product of (B1) a polyamine having a molecular weight of at least 240, and (B2) a Michael addition receptor, wherein viscosity @ 23° C. according to ASTM D1084-16, remains below 150 cps after four hours, and wherein the adhesive develops an acceptable bond strength to a substrate, defined as having a minimum of 150 g/in. measured @ 23° C. according to ASTM D 1876-01 or substrate tear, in less than five days after the substrate is laminated with the adhesive. The inventive flexible packaging adhesives are free of aromatic amines and may find use in multilayer laminates for a variety of industries, including the food processing, cosmetics, and detergents industries.

12 Claims, No Drawings

FLEXIBLE POLYUREAS FOR FLEXIBLE PACKAGING ADHESIVE WITHOUT AROMATIC AMINE MIGRATION

CROSS REFERENCE TO RELATED APPLICATIONS

The present application is a divisional application of U.S. patent application Ser. No. 16/987,503, filed Aug. 7, 2020, which in turn claims priority to U.S. Provisional Patent Application Ser. No. 62/884,205, filed Aug. 8, 2019, the contents of each are incorporated herein by reference.

FIELD OF THE INVENTION

The present invention relates in general to adhesives, and more specifically to flexibilized polyurea compositions for producing flexible packaging adhesives which do not suffer from aromatic amine migration.

BACKGROUND OF THE INVENTION

Flexible packagings intended for the packaging of diverse products, such as those manufactured by the food processing, cosmetics or detergents industries, are usually made of several thin layers (sheets or films). The thickness of these layers is between 5 µm and 150 µm and may comprise several different materials, such as paper, metal (e.g., aluminum) or thermoplastic polymers. The corresponding multilayer laminate, which may have a thickness of from 20 µm to 400 µm, makes it possible to combine the properties of the different individual layers of material to provide the consumer with a combination of characteristics suitable for the final flexible packaging. Such characteristics include, but are not limited to visual appearance, a barrier effect (to atmospheric moisture or to oxygen), contact with food without risk of toxicity or of modification to the organoleptic properties of the packaged foodstuffs, chemical resistance for certain products, such as ketchup or liquid soap, and good behavior at high temperature, for example in the case of pasteurization.

In conventional multilayer flexible packaging, two component (2K) polyurethane compositions are typically used to laminate the layers. These compositions are oftentimes based on polyurethane systems that employ aromatic polyisocyanates. After the adhesive is applied and the films are laminated, the films are wound onto large rolls and are stored at elevated temperatures for several days to allow for any unreacted polyisocyanate monomer to complete curing. If this curing step is eliminated, or is of insufficient length, the laminates may suffer from two problems: first, the mechanical strength of the adhesive bond may not be sufficient for further handling and use of the laminated packaging film; and second, unreacted monomeric aromatic polyisocyanates can react with moisture in the product to be packaged, generating monomeric aromatic polyamines, which may migrate into the contents of the package. This is particularly problematic in high performance packaging systems, which are subjected to elevated temperatures (e.g., 116-130° C.) during sterilization of the packaging material and contents (retort process).

The packaging industry is continually trying to identify adhesive solutions to eliminate this aromatic amine migration problem for health and safety reasons, while maintaining the cure speeds to which they are accustomed with conventional two component (2K) aromatic polyisocyanate-based adhesives. One approach has been to replace the aromatic polyisocyanate component in the two component (2K) polyurethane adhesive composition with aliphatic polyisocyanates. Although this approach eliminates the potential for aromatic amine formation, the lower reactivity observed with the use of aliphatic isocyanates leads to a much slower cure time. As a result, the rolled films must be stored for a much longer time (potentially up to two weeks) compared with the two to three day cure of the aromatic isocyanate-based adhesives.

Polyaspartate resins are well-known in the coatings industry. These polyaspartates are typically used in conjunction with various aliphatic polyisocyanates to produce hard, durable coatings, which can be used in applications such as floor coatings and industrial coatings. Common commercial polyaspartates are typically based on the Michael Addition product of relatively low molecular weight diamines with $\alpha,\beta$-unsaturated diesters such as diethyl maleate. Suitable low molecular weight diamines include cycloaliphatic diamines such as 4,4'-methylenebiscyclohexylamine (PACM 20), 3,3'-dimethyl-4,4'-diaminodicyclohexylmethane (LAROMIN C260) or on the acyclic aliphatic diamine 2-methylpentamethylenediamine (DYTEK A).

The polyaspartate resins described above have the advantage of relatively high reactivity with aliphatic polyisocyanates, compared to that of hydroxyl-terminated resins. Furthermore, this reactivity can be readily "tuned" by varying the diamine or polyamine on which they are based and/or controlling the amount of water present, either in the resins themselves, or in the ambient environment during cure. However, these systems when cured with conventional low molecular weight polyisocyanates produce hard, rather inflexible coatings which would be unsuitable for flexible packaging adhesive applications.

Thus, there continues to exist in the art a need for adhesive compositions that, 1) can meet the mechanical requirements necessary for a film lamination adhesive, 2) do not suffer from aromatic amine migration, and 3) have sufficient cure speed so that extended cure times are not required to meet these requirements.

SUMMARY OF THE INVENTION

The present invention provides adhesives that: 1) meet the mechanical requirements necessary for a film lamination adhesive; 2) do not suffer from aromatic amine migration; 3) have sufficient pot-life to facilitate ease of application to the films to be laminated, and 4) have sufficient cure speed so that extended cure times are not required to meet these requirements. The adhesives of the invention may find use in the production of multi-layered laminated films, such as those useful in the flexible packagings market, where aromatic amine migration is a concern such as food, medical, cosmetics, and detergents packaging.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The present invention relies on flexible polyaspartates to overcome the rigidity issues of conventional polyaspartate based polyureas, while maintaining the fast, tunable cure speed desired to provide aromatic amine-free adhesives. One of the attractive features of aspartates is their relatively fast and tunable cure speed with aliphatic isocyanates as compared with polyurethane systems. This reactivity can be tuned by selecting diamines with differing degrees of steric hindrance around the amine.

In various embodiments of the invention, flexibilized polyaspartates are prepared from polyamines having a molecular weight of at least 240 g/mole and an amine functionality of at least 2. Polyaspartates prepared using e.g., diethyl maleate, from these polyamines are expected to provide much more flexible materials when cured with low molecular weight polyisocyanates, such as HDI trimers. The polyamines used to prepare these polyaspartates may be based on backbones known in the art such as, for example, a C3 or C4 polyether, polyester, polycarbonate, polycarbonate ester, polycaprolactone, polybutadiene, and mixtures thereof. In selected embodiments, renewable content may be introduced into the polyamine by including renewable components, e.g., bio-based succinic acid or bio-based 1,3-propanediol into the polyamine backbone.

In a first aspect, the present invention is directed to an adhesive comprising a reaction product of (A) an aliphatic polyisocyanate having a molecular weight of from 132 to 700; and (B) a polyaspartate comprising a reaction product of (B1) a polyamine having a molecular weight of at least 240, and (B2) a Michael addition receptor, wherein viscosity @ 23° C. according to ASTM D1084-16, remains below 150 cps after four hours, and wherein the adhesive develops an acceptable bond strength to a substrate, defined as having a minimum of 150 g/in. measured @ 23° C. according to ASTM D 1876-01 or substrate tear, in less than five days after the substrate is laminated with the adhesive. The adhesive is aromatic amine-free.

In a second embodiment, the present invention is directed to a multi-layered laminated film comprising a layer of the adhesive according to the previous paragraph applied to one or more substrate layers, each layer independently having a thickness of from 5 μm to 250 μm, wherein the multi-layered laminated film has a total thickness of from 20 μm to 750 μm.

The inventive flexibilized polyaspartates may be combined with conventional polyaspartates (those based on 4,4'-methylenebiscyclohexylamine (PACM-20), 3,3'-dimethyl-4,4'-diaminodicyclohexylmethane (LAROMIN C260) or on the acyclic aliphatic diamine 2-methylpentamethylenediamine (DYTEK A) and/or with other polyols (polyether, polyester, polycarbonate, polycaprolactone, etc. and/or low MW polyol chain extenders (ethylene glycol; diethylene glycol; (1,2 or 1,3) propylene diol; (1,4 or 1,3) butane diol; (1,6) hexanediol; (1,8) octanediol; neopentyl glycol; (1,4) cyclohexanedimethanol; bis(2-hydroxyethyl) hydroquinone (HQEE); 2-methyl-1,3-propanediol; 2,2,4-trimethyl-1,3-pentanediol; triethylene glycol; tetraethylene glycol; polyethylene glycol; polypropylene glycol; dipropylene glycol; dibutylene glycol; polybutylene glycol, glycerine, trimethlyolpropane, and mixtures thereof) prior to reacting with the aliphatic polyisocyanate. This would allow fine tuning of the modulus and reactivity by selection of appropriate components.

The flexibilized polyaspartates of this invention may also be combined with the aliphatic polyisocyanate functional prepolymers or mixtures thereof such as those described in co-assigned U.S. patent application Ser. No. 62/884,234, filed Aug. 8, 2019, entitled, "FLEXIBILIZED POLYURETHANES FOR FLEXIBLE PACKAGING ADHESIVE WITHOUT AROMATIC AMINE MIGRATION" to produce flexible polyureas suitable for packaging adhesives.

As used herein, the term "polymer" encompasses pre-polymers, oligomers and both homopolymers and copolymers; the prefix "poly" in this context referring to two or more. As used herein, the term "molecular weight", when used in reference to a polymer, refers to the number average molecular weight, unless otherwise specified.

The terms "adhesive" or "adhesive composition", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

The aromatic amine-free adhesives described herein comprise a two-component adhesive composition. As used herein, the term "two-component" refers to an adhesive or adhesive composition comprising at least two components that must be stored in separate containers because of their mutual reactivity. For instance, two-component polyurea adhesive systems and compositions may comprise a hardener/crosslinker component comprising an isocyanate-functional compound, and a separate binder component comprising an amino-functional compound. The two separate components are generally not mixed until shortly before application because of the limited pot-life of the mixture. When the two separate components are mixed and applied as a film on a substrate, the mutually reactive compounds in the two components react to crosslink and form a cured adhesive film.

As used herein, the term "polyurethane" refers to polymeric or oligomeric materials comprising urethane groups, urea groups, or both. Accordingly, as used herein, the term "polyurethane" is synonymous with the terms polyurea, polyurethane/urea, and modifications thereof. The term "polyurethane" also refers to crosslinked polymer networks in which the crosslinks comprise urethane and/or urea linkages, and/or the constituent polymer chains comprise urethane and/or urea linkages.

As used herein, the term "polyol" refers to compounds comprising at least two free hydroxyl groups. Polyols include polymers comprising pendant and terminal hydroxyl groups.

As used herein, the term "polyamine" refers to compounds comprising at least two free primary and/or secondary amine groups. Polyamines include polymers comprising at least two pendant and/or terminal amine groups. The polyamines useful in producing the polyaspartates of the present invention include those known in the art, including for example those based on polyether, polyester, polycarbonate, polycarbonate ester, polycaprolactone, and polybutadiene backbones and have a molecular weight of at least 240 g/mol and an amine functionality of at least 2.

As used herein, the term "polyaspartate" refers to compounds comprising the reaction product of at least one polyamine with at least one Michael acceptor. Polyaspartates include polymers comprising at least two pendant and/or terminal secondary amine groups.

As used herein, the term "prepolymer" refers to a material capable of undergoing polymerization to form a polymer having a molecular weight higher than that of the material before polymerization. In some embodiments, the prepolymer can be a pre-formed polymer having reacting groups and being capable of further polymerization to form a polymer of a higher molecular weight.

As used herein, the term "polyisocyanate" refers to compounds comprising at least two un-reacted isocyanate groups. Polyisocyanates include diisocyanates and diisocyanate reaction products comprising, for example, biuret, isocyanurate, uretdione, urethane, urea, iminooxadiazine dione, oxadiazine dione, carbodiimide, acyl urea, allophanate groups, and combinations of any thereof.

Suitable low molecular weight aliphatic polyisocyanates (A) for use in accordance with the present invention are those having a molecular weight of 132 to 700, such as 1,4-tetramethylene diisocyanate, 1,6-hexamethylene diisocyanate (HDI), 1,5-pentamethylene diisocyanate (PDI), 2,2,4- and/or 2,4,4-trimethyl-hexamethylene diisocyanate, dodecamethylene diisocyanate, 2-methyl-1,5-diisocyanatopentane, 1,4-diisocyanatocyclohexane, 5-isocyanato-1-(isocyanatomethyl)-1,3,3-trimethylcyclohexane (IPDI), 2,4- and/or 4,4' diisocyanato-dicyclohexyl-methane, 1-isocyanato-1-methyl-3(4)-isocyanatomethyl-cyclohexane (IMCI), 1,4-cyclohexane diisocyanate (CHDI), and trimers, isocyanurates, uretdiones, biurets, allophanates, iminooxadiazine diones, carbodiimides, oxadiazine triones, and prepolymers of any of these, and mixtures thereof. As those skilled in the art will appreciate, the low molecular weight aliphatic polyisocyanates (A) may also be combined with NCO-functional aliphatic polyisocyanate terminated prepolymers.

Polyols may be combined with the flexibilized polyaspartates to tune the reaction rate and physical properties of the resulting polymer. In this case, the resulting polymer would be hybrid polyurethane-polyureas. The polyols useful in the present invention may be either low molecular weight (62-399 Da, as determined by gel permeation chromatography) or high molecular weight (400 to 10,000 Da, as determined by gel permeation chromatography) materials and in various embodiments will have average hydroxyl values as determined by ASTM E222-17, Method B, of between 1000 and 10, and preferably between 500 and 50.

The low molecular weight diols, triols, and higher alcohols useful in the present invention are known to those skilled in the art. In many embodiments, they are materials having hydroxyl values of 200 and above, and in certain embodiments within the range of 1500 to 200. Such materials include aliphatic polyols, particularly alkylene polyols containing from 2 to 18 carbon atoms. Examples include ethylene glycol, 1,4-butanediol, 1,6-hexanediol, and cycloaliphatic polyols such as cyclohexane dimethanol. Examples of triols and higher alcohols include trimethylol propane and pentaerythritol. Also useful are polyols containing ether linkages such as diethylene glycol and triethylene glycol.

Examples of polyether polyols which can be combined with the flexibilized polyaspartates include poly(oxytetramethylene) glycols, poly(oxyethylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher functionality polyols, such as trimethylol propane, pentaerythritol and the like. One commonly utilized oxyalkylation method is by reacting a polyol with an alkylene oxide, for example, ethylene oxide in the presence of a basic catalyst or a double metal cyanide (DMC) catalyst.

Polyester polyols can also be used as a polymeric polyol component in the certain embodiments of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

The diols which may be employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher functionality polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

In addition to polyester polyols formed from polybasic acids and polyols, polycaprolactone-type polyesters can also be employed. These products are formed from the reaction of a cyclic lactone such as ε-caprolactone with a polyol with primary hydroxyls such as those mentioned above. Such products are described in U.S. Pat. No. 3,169,949.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

The polyaspartate (B) includes one or more polyaspartate compounds corresponding to formula (I)

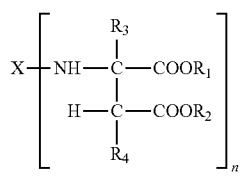

wherein:
n is an integer of at least 2;
X represents an aliphatic residue having a molecular weight ≥208;
$R_1$ and $R_2$ each independently represent organic groups that are inert to isocyanate groups under reaction conditions; and
$R_3$ and $R_4$ each independently represent hydrogen or organic groups that are inert to isocyanate groups under reaction conditions.

As those skilled in the art are aware, polyaspartates may be produced by the reaction of a polyamine (B1) with a Michael addition receptor, i.e., an olefin substituted on one or both of the olefinic carbons with an electron withdrawing group such as cyano, keto, or ester (an electrophile) in a Michael addition reaction. Examples of suitable Michael addition receptors (B2) include, but are not limited to, acrylates, and diesters such as dimethyl maleate, diethyl maleate, dibutyl maleate, dimethyl fumarate, diethyl fumarate, and dibutyl fumarate.

As will be appreciated by those skilled in the art, the polyaspartate (B) also may include one or more a low molecular weight polyamines. Additionally, the polyamines can have a wide range of amine functionality, repeat unit type, distribution, etc. This wide range of molecular weight, amine functionality, repeating unit type, and distribution can provide versatility in the design of new compounds or mixtures.

In various embodiments of the invention, a single high molecular weight polyamine may be used. Also, mixtures of high molecular weight polyamines, such as mixtures of di- and trifunctional materials and/or different molecular weight or different chemical composition materials, may be used. The term "high molecular weight" is intended to include polyamines having a molecular weight of at least 240 in various embodiments. In selected embodiments, the polyamines have a molecular weight of from 240 to 6000. In certain embodiments, the polyamines have a molecular weight of from 400 to 2000. Non-limiting examples can include polyethylene glycol bis(amine), polypropylene glycol bis (amine), or polytetramethylene glycol bis (amine), the like, or a combination thereof.

In certain embodiments, the polyamine can be for example, one or more of the JEFFAMINE series of amine-terminated polyethers from Huntsman Corp., such as, JEFFAMINE D-400, JEFFAMINE D-2000, JEFFAMINE D-4000, JEFFAMINE T-3000. POLYETHERAMINE D 400, POLYETHERAMINE T 403 and POLYETHERAMINE T 5000 from BASF.

The production of the polyaspartates may take place within a temperature range of 0° C. to 100° C., and in certain embodiments, the temperature is no greater than 45° C.

The flexibilized polyaspartates prepared from suitable high molecular weight diamines can also be used in combination with polyaspartates prepared from low molecular weight diamines. These suitable low molecular weight diamines have molecular weights in various embodiments of from 30 to 400, in selected embodiments of from 60 to 300. Suitable low-molecular-weight diamines include, but are not limited to, ethylene diamine, 1,2- and 1,3-diaminopropane, 1,3-, 1,4- and 1,6-diamino-hexane, 1,3-diamino-2,2-dimethyl propane, 2-Methylpentamethylenediamine, isophorone diamine, 4,4'-diamino-dicyclohexyl methane, 4,4-diamino-3,3'-dimethyldicyclohexyl methane, 1,4-bis-(2-amino-prop-2-yl)-cyclohexane, hydrazine, piperazine, bis (4-aminocyclohexyl)methane, and hexamethylenediamine and mixtures of such diamines. Representative polyaspartates prepared from these low molecular weight diamines include DESMOPHEN NH-1220, DESMOPHEN NH-1420, and DESMOPHEN NH-1520, commercially available from Covestro.

Those on skilled in the art will also recognize that other components (e.g. polyols, or polyaspartates based on low molecular weight polyamines) can be added to the adhesive as well as prepolymers of aliphatic polyisocyanates.

The present disclosure also describes a method of minimizing aromatic amine migration in multi-layered substrate such as a packaging material. This method includes forming or applying an adhesive as described herein to a substrate of the packaging material and curing the adhesive.

The inventive adhesive can be formed on or applied to a variety of substrates, including multi-layered laminated films such as those for packaging materials or the like, particularly flexible packaging materials. Non-limiting examples of substrates include metals (aluminum, copper, and steel), plastics, wood, cement, concrete, glass, the like, or a combination thereof. The adhesive of the invention can be applied by painting, rolling, pouring, spraying, dipping, casting, dispensing, the like, or a combination thereof. The inventive adhesive and substrate layers may be laminated together by known processes.

In various embodiments, each layer of the multi-layered laminate may have a thickness of from 5 μm to 250 μm and are bonded together by a continuous layer of the inventive adhesive in a crosslinked state. In various embodiments, the inventive multi-layered laminated film has a total thickness of from 20 μm to 750 μm.

These processes comprise a step of coating the adhesive over a first layer of a substrate, by deposition of a continuous layer of adhesive with a controlled thickness in various embodiments of less than 100 μm, corresponding to an amount of adhesive (or grammage) which is also controlled, preferably not exceeding 10 g/m². This coating step is followed by a step of laminating a second layer of a substrate, identical to or different from the first by the application, under pressure to the first layer covered with the layer of adhesive.

To form the final flexible packaging, the multilayer laminate may be slit, cut and sealed. The inventive adhesives optionally may contain additives such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators, and extenders.

Although the present invention is described and exemplified in the instant Specification in the context of an adhesive, the invention is not intended to be so limited. The principles of the invention are equally applicable to polyurethane, polyurea, polyurethane/urea coatings, adhesives, sealants, composites, castings, and films. Flexible packagings made with the inventive aromatic amine-free adhesives may find use in the food processing, cosmetics, and detergents industries, amongst others.

EXAMPLES

The non-limiting and non-exhaustive examples that follow are intended to further describe various non-limiting and non-exhaustive embodiments without restricting the scope of the embodiments described in this specification. The following materials were used in preparation of the Examples. All quantities given in "parts" and "percents" are understood to be by weight, unless otherwise indicated.

| | |
|---|---|
| POLYISOCYANATE A | 1, 6-hexamethylene diisocyanate trimer (isocyanurate) having an average isocyanate content of 21.8 wt. %; |
| POLYISOCYANATE B | an NCO terminated prepolymer based on 1, 6-hexamethylene diisocyanate and a polypropylene oxide polyether diol (hydroxyl value of 515 mg KOH/g.); the prepolymer had an isocyanate content of 12.5 wt. %; |
| DIASPARTATE A | a diaspartate prepared from a 2000 molecular weight aliphatic polyether diamine based on polyoxypropylenediamine, commercially available from Huntsman as JEFFAMINE D-2000, and diethyl maleate; the diaspartate had a measured amine value of 46.6 mg KOH/g; |
| DIASPARTATE B | a diaspartate prepared from a 400 molecular weight aliphatic polyether diamine based on polyoxypropylenediamine, commercially available from Huntsman as JEFFAMINE D-400, and diethyl maleate; the diaspartate had a measured amine value of 143.8 mg KOH/g; |
| DIASPARTATE C | a diaspartate prepared from 4, 4-diaminodicyclohexyl methane and diethyl maleate having an approximate amine value of 204 mg KOH/g; |
| POLYESTER A | an aliphatic and aromatic polyester diol with a hydroxyl value of approximately 56 mg KOH/g; |
| ETHYL ACETATE | commercially available from Sigma Aldrich. |

General Adhesive Preparation and Testing Procedures

Bond Strength

In the following Examples, the isocyanate functional material and either the amino or hydroxyl functional material were combined at 23° C. at an NCO/(OH or NH) ratio of 1.1 to 1.0. The samples were diluted to 50% solids using dry ETHYL ACETATE to assure consistent adhesive application thickness between samples. Each formulation was applied to corona-treated polyethylene terephthalate (PET) film using a wire wound rod, resulting in a dry adhesive film weight of between 2.5-5.0 g/m². The samples were dried at 60° C. for 60 seconds, then laminated to corona-treated PET, metalized PET (MPET), corona-treated cast polypropylene (cPP) and aluminum foil (Al) using a hot roll laminator at 50 psig, 65° C. traveling at two feet per minute.

Bond strength measurements, according to ASTM D 1876-01, were conducted using an INSTRON machine at a peel rate of 12 in/min. at time intervals of four hours, one day, seven days and 14 days after lamination. All results are given in grams per inch (g/in.) with failure modes designated as follows: ST is "Substrate Tear" meaning one or more of the substrates tore during analysis; P is "Peel" meaning the sample smoothly peeled during analysis; Z is "Zipper" meaning the sample rapidly increased and decreased in bond strength during analysis; C is "Cohesive" meaning the adhesive split during analysis partially staying adhered to both substrates; and AF is "Adhesive Failure" meaning the adhesive completely and cleanly separated from one of the two substrates during analysis. Bond strength results are presented in the Tables. In various embodiments of the invention, the laminates develop acceptable bond strength—defined for the purposes of the invention as having a minimum of 150 g/in. measured @ 23° C. according to ASTM D 1876-01 or substrate tear in less than 5 days at 23° C., in some embodiments, in from 1 to 5 days at 23° C. and in certain embodiments in less than 1 day at 23° C.

Pot-Life

In the following Examples, the isocyanate functional material and either the amino or hydroxyl functional material were combined at 23° C. at an NCO/(OH or NH) ratio of 1.1:1.0. The samples were then diluted using dry ETHYL ACETATE to a viscosity of 20 centipoise (cps). Viscosity was monitored according to ASTM D1084-16 at 23° C. and recorded at time intervals of initial, one hour, two hours, four hours and eight hours. All results are given in centipoise (cps). The pot-life of the inventive adhesive as measured by viscosity @ 23° C. according to ASTM D1084-16, remained below 150 cps after four hours.

Comparative Example 1

POLYISOCYANATE A (44.3 g) was added to DIASPARTATE C (55.7 g) and mixed for 60 seconds until homogeneous. Table I provides bond strength measurements. Pot-life measurements were, initial: 20 cps; one hour: 60 cps; two hours: 395 cps; four hours: gel; and eight hours; gel.

TABLE I

| | Bond Strength (g/in.) | | | |
|---|---|---|---|---|
| Laminate Structure | 4 Hours | 1 Day | 7 Days | 14 Days |
| PET/PET | 181 $^{AF}$ | 493 $^{ST}$ | 1063 $^{ST}$ | 518 $^{ST}$ |
| PET/MPET | 181 $^{AF}$ | 78 $^{C}$ | 596 $^{ST}$ | 207 $^{ST}$ |
| PET/cPP | 104 $^{AF}$ | 181 $^{C}$ | 155 $^{AF}$ | 130 $^{AF}$ |
| PET/A1 | 104 $^{AF}$ | 26 $^{AF}$ | 104 $^{AF}$ | 181 $^{AF}$ |

Note:
ST = Substrate Tear;
P = Peel;
Z = Zipper;
C = Cohesive; and
AF = Adhesive Failure Comparative Example 2

POLYISOCYANATE B (57.0 g) was added to DIASPARTATE C (43.0 g) and mixed for 60 seconds until homogeneous. Table II provides bond strength measurements. Pot-life measurements were, initial: 18 cps; one hour: 18 cps; two hours: 18 cps; four hours: 20 cps; and eight hours; 23 cps.

TABLE II

| | Bond Strength (g/in.) | | | |
|---|---|---|---|---|
| Laminate Structure | 4 Hours | 1 Day | 7 Days | 14 Days |
| PET/PET | 112 $^{C}$ | 337 $^{ST}$ | 492 $^{ST}$ | 492 $^{ST}$ |
| PET/MPET | 26 $^{C}$ | 251 $^{ST}$ | 207 $^{ST}$ | 207 $^{ST}$ |

TABLE II-continued

| | Bond Strength (g/in.) | | | |
|---|---|---|---|---|
| Laminate Structure | 4 Hours | 1 Day | 7 Days | 14 Days |
| PET/cPP | 78 $^{AF}$ | 95 $^{AF}$ | 95 $^{AF}$ | 147 $^{AF}$ |
| PET/A1 | 207 $^{C}$ | 199 $^{AF}$ | 138 $^{AF}$ | 138 $^{AF}$ |

Note:
ST = Substrate Tear;
P = Peel;
Z = Zipper;
C = Cohesive; and
AF = Adhesive Failure Comparative Example 3

POLYISOCYANATE A (17.2 g) was added to POLYESTER A (82.8 g) and mixed for 60 seconds until homogeneous. Table III provides bond strength measurements. Pot-life measurements were, initial: 21 cps; one hour: 21 cps; two hours: 22 cps; four hours: 22 cps; and eight hours: 22 cps.

TABLE III

| | Bond Strength (g/in.) | | | |
|---|---|---|---|---|
| Laminate Structure | 4 Hours | 1 Day | 7 Days | 14 Days |
| PET/PET | 0 $^{C}$ | 26 $^{C}$ | 441 $^{AF}$ | 475 $^{AF}$ |
| PET/MPET | 0 $^{C}$ | 26 $^{C}$ | 795 $^{ST}$ | 829 $^{ST}$ |
| PET/cPP | 26 $^{C}$ | 26 $^{C}$ | 769 $^{AF}$ | 994 $^{AF}$ |
| PET/A1 | 52 $^{C}$ | 65 $^{C}$ | 484 $^{AF}$ | 562 $^{AF}$ |

Note:
ST = Substrate Tear;
P = Peel;
Z = Zipper;
C = Cohesive; and
AF = Adhesive Failure Example 4

POLYISOCYANATE A (35.2 g) was added to DIASPARTATE B (64.8 g) and mixed for 60 seconds until homogeneous. Table IV provides bond strength measurements. Pot-life measurements were, initial: 15 cps; one hour: 15 cps; two hours: 17 cps; four hours: 29 cps; and eight hours; 67 cps.

TABLE IV

| | Bond Strength (g/in.) | | | |
|---|---|---|---|---|
| Laminate Structure | 4 Hours | 1 Day | 7 Days | 14 Days |
| PET/PET | 311 $^{C}$ | 377 $^{AF}$ | 545 $^{ST}$ | 324 $^{C}$ |
| PET/MPET | 817 $^{ST}$ | 363 $^{ST}$ | 506 $^{ST}$ | 480 $^{ST}$ |
| PET/cPP | 561 $^{C}$ | 441 $^{AF}$ | 389 $^{ST}$ | 1020 $^{AF}$ |
| PET/A1 | 450 $^{AF}$ | 441 $^{AF}$ | 428 $^{AF}$ | 441 $^{AF}$ |

Note:
ST = Substrate Tear;
P = Peel;
Z = Zipper;
C = Cohesive; and
AF = Adhesive Failure Example 5

POLYISOCYANATE B (48.7 g) was added to DIASPARTATE B (51.3 g) and mixed for 60 seconds until homogeneous. Table V provides bond strength measurements. Pot-life measurements were, initial: 18 cps; one hour: 19 cps; two hours: 28 cps; four hours: 73 cps; and eight hours; 199 cps.

TABLE V

| Laminate Structure | Bond Strength (g/in.) | | | |
|---|---|---|---|---|
| | 4 Hours | 1 Day | 7 Days | 14 Days |
| PET/PET | 380 $^C$ | 475 $^{AF}$ | 661 $^{AF}$ | 648 $^C$ |
| PET/MPET | 579 $^C$ | 380 $^{ST}$ | 946 $^{ST}$ | 804 $^{AF}$ |
| PET/cPP | 518 $^C$ | 570 $^{AF}$ | 985 $^{AF}$ | 1076 $^C$ |
| PET/A1 | 629 $^C$ | 544 $^{AF}$ | 518 $^{AF}$ | 544 $^{AF}$ |

Note:
ST = Substrate Tear;
P = Peel;
Z = Zipper;
C = Cohesive; and
AF = Adhesive Failure Example 6

POLYISOCYANATE A (15.1 g) was added to DIASPARTATE A (84.9 g) and mixed for 60 seconds until homogeneous. Table VI provides bond strength measurements. Pot-life measurements were, initial: 19 cps; one hour: 20 cps; two hours: 20 cps; four hours: 20 cps; and eight hours; 38 cps.

TABLE VI

| Laminate Structure | Bond Strength (g/in.) | | | |
|---|---|---|---|---|
| | 4 Hours | 1 Day | 7 Days | 14 Days |
| PET/PET | 224 $^C$ | 285 $^C$ | 302 $^{AF}$ | 194 $^C$ |
| PET/MPET | 450 $^C$ | 518 $^{AF}$ | 402 $^{AF}$ | 350 $^{AF}$ |
| PET/cPP | 346 $^C$ | 527 $^C$ | 415 $^{AF}$ | 402 $^C$ |
| PET/A1 | 276 $^{AF}$ | 346 $^{AF}$ | 285 $^{AF}$ | 350 $^{AF}$ |

Note:
ST = Substrate Tear;
P = Peel;
Z = Zipper;
C = Cohesive; and
AF = Adhesive Failure Table VII provides a summary of the Examples.

Comparative Example 1 was made with POLYISOCYANATE A and DIASPARTATE C and represents a formulation that uses a conventional polyaspartate used for coatings applications. This aspartate was based on a polyamine having a MW of ~210 g/mol., lower than that specified in our invention. As can be appreciated from reference to Table VII, Comparative Example 1 did not demonstrate a suitable pot-life or achieve the minimum bond strength as specified for this invention.

Comparative Example 2 was made with POLYISOCYANATE B and DIASPARTATE C and represents a formulation that uses a conventional polyaspartate used for coatings applications. This polyaspartate was based on a polyamine having a MW of ~210 g/mol., lower than that specified in our invention. As can be appreciated from reference to Table VII, Comparative Example 2 did not demonstrate suitable bond strength development as specified in this invention on the substrates that were evaluated. POLYISOCYANATE B, an aliphatic prepolymer with a 12.5 wt. % NCO and lower functionality, helped provide a suitable pot-life when compared to Comparative Example 1 however; it did not elevate the bond strength to the suitable level specified for this invention.

Comparative Example 3 was made with POLYISOCYANATE A and POLYESTER A and represented a typical aliphatic based two component (2K) formulation that could be used in a laminating adhesive application. As can be appreciated from reference to Table VII, Comparative Example 3 did not demonstrate a suitable bond strength development as specified for this invention.

Examples 4, 5 and 6 were prepared using polyaspartates according to our invention. These polyaspartates were based on polyamines having MW of 400 or 2000 g/mole. As can be appreciated from reference to Table VII, Examples 4, 5 and 6 demonstrated both suitable pot-life and bond strength development as specified for this invention.

TABLE VII

| Ex. | Potential PAA migration | Components | Viscosity remained below 150 cps @ 23° C. after 4 hours | Time for bond strength to reach a minimum of 150 g/in. or substrate tear @ 23° C. (days) | Comments |
|---|---|---|---|---|---|
| C1 | No | POLYISOCYANATE A + DIASPARTATE C | No | — | Did not achieve minimum pot-life or bond strength threshold |
| C2 | No | POLYISOCYANATE B + DIASPARTATE C | Yes | — | Did not achieve minimum bond strength threshold |
| C3 | No | POLYISOCYANATE A + POLYESTER A | Yes | — | Did not achieve minimum bond strength threshold |
| 4 | No | POLYISOCYANATE A + DIASPARTATE B | Yes | 0.17 | Achieved minimum thresholds for pot-life and bond strength |
| 5 | No | POLYISOCYANATE B + DIASPARTATE B | Yes | 0.17 | Achieved minimum thresholds for pot-life and bond strength |
| 6 | No | POLYISOCYANATE A + DIASPARTATE A | Yes | 0.17 | Achieved minimum thresholds for pot-life and bond strength |

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

Clause 1. An adhesive comprising a reaction product of (A) an aliphatic polyisocyanate having a molecular weight of from 132 to 700; and (B) a polyaspartate comprising a reaction product of (B1) a polyamine having a molecular weight of at least 240, and (B2) a Michael addition receptor, wherein viscosity @ 23° C. according to ASTM D1084-16, remains below 150 cps after four hours, and wherein the adhesive develops an acceptable bond strength to a substrate, defined as having a minimum of 150 g/in. measured @ 23° C. according to ASTM D 1876-01 or substrate tear, in less than five days after the substrate is laminated with the adhesive.

Clause 2. The adhesive according to Clause 1, wherein the adhesive develops an acceptable bond strength to a substrate, defined as having a minimum of 150 g/in. measured @ 23° C. according to ASTM D 1876-01 or substrate tear, in from one to five days after the substrate is laminated with the adhesive.

Clause 3. The adhesive according to one of Clauses 1 and 2, wherein the adhesive develops an acceptable bond strength to a substrate, defined as having a minimum of 150 g/in. measured @ 23° C. according to ASTM D 1876-01 or substrate tear, in less than one day after the substrate is laminated with the adhesive.

Clause 4. The adhesive according to any one of Clauses 1 to 3, wherein the aliphatic polyisocyanate (A) is selected from the group consisting of 1,4-tetramethylene diisocyanate, 1,6-hexamethylene diisocyanate (MI), 1,5-pentamethylene diisocyanate (PDI), 2,2,4- and/or 2,4,4-trimethyl-hexamethylene diisocyanate, dodecamethylene diisocyanate, 2-methyl-1,5-diisocyanatopentane, 1,4-diisocyanatocyclohexane, 5-isocyanato-1-(isocyanatomethyl)-1,3,3-trimethylcyclohexane (IPDI), 2,4- and/or 4,4' diisocyanato-dicyclohexyl-methane, 1-isocyanato-1-methyl-3(4)-isocyanatomethyl-cyclohexane (IMCI), 1,4-cyclohexane diisocyanate (CHDI), and trimers, isocyanurates, uretdiones, biurets, allophanates, iminooxadiazine diones, carbodiimides, oxadiazine triones, and prepolymers of any of these, and mixtures thereof.

Clause 5. The adhesive according to any one of Clauses 1 to 4, wherein the polyamine (B1) has a molecular weight of from 240 and 6000.

Clause 6. The adhesive according to any one of Clauses 1 to 5, wherein the polyamine (B1) has a molecular weight of from 400 to 2000.

Clause 7. The adhesive according to any one of Clauses 1 to 6, wherein the polyamine (B1) is based on one of a polyether, a polyester, a polycarbonate, a polycarbonate ester, a polycaprolactone, and a polybutadiene, and combinations thereof.

Clause 8. The adhesive according to any one of Clauses 1 to 7, wherein the Michael addition receptor (B2) is selected from the group consisting of dimethyl maleate, diethyl maleate, dibutyl maleate, dimethyl fumarate, diethyl fumarate, dibutyl fumarate, acrylates, and combinations thereof.

Clause 9. A substrate having applied thereto the adhesive according to any one of Clauses 1 to 7.

Clause 10. The substrate according to Clause 9, wherein the substrate is selected from the group consisting of aluminum, copper, and steel, thermoplastic polymers, wood, cement, concrete, and glass.

Clause 11. A multi-layered laminated film comprising a layer of the adhesive according to any one of Clauses 1 to 7 applied to one or more substrate layers, each layer independently having a thickness of from 5 µm to 250 µm, wherein the multi-layered laminated film has a total thickness of from 20 µm to 750 µm.

Clause 12. The multi-layered laminated film according to Clause 11, wherein the one or more substrate layers are independently selected from the group consisting of paper, metal and thermoplastic polymers.

Clause 13. The multi-layered laminated film according to Clause 12, wherein the metal is selected from the group consisting of aluminum, copper, and steel.

Clause 14. The multi-layered laminated film according to one of Clauses 12 and 13, wherein the thermoplastic polymer is independently selected from the group consisting of polyethylene, corona-treated polyethylene, polyethylene terephthalate, corona-treated polyethylene terephthalate, metalized polyethylene terephthalate, polypropylene, and corona-treated polypropylene.

Clause 15. A flexible packaging material comprising the multi-layered laminated film according to any one of Clauses 11 to 14.

Clause 16. A process of minimizing aromatic amine migration in a packaging material, the process comprising: applying the adhesive according to any one of Clauses 1 to 7 to a packaging material substrate, and curing the adhesive.

Clause 17. The process according to Clause 16, wherein the packaging material substrate comprises one or more layers selected from the group consisting of paper, metal and thermoplastic polymers.

Clause 18. The process according to Clause 17, wherein the thermoplastic polymers are independently selected from the group consisting of polyethylene, polyethylene terephthalate, corona-treated polyethylene, corona-treated polyethylene terephthalate, metalized polyethylene terephthalate, polypropylene, and corona-treated polypropylene.

What is claimed is:

1. A multi-layered laminated film comprising a layer of an adhesive applied to one or more substrate layers, the adhesive comprising a reaction product of:
    (A) an aliphatic polyisocyanate having a number average molecular weight of from 132 to 700, wherein, if (A) includes a plurality of aliphatic polyisocyanates, the plurality of aliphatic polyisocyanates has a number average molecular weight of from 132 to 700; and
    (B) a polyaspartate comprising a reaction product of:
        (B1) a polyamine having a molecular weight of at least 240, and
        (B2) a Michael addition receptor,
        wherein the polyaspartate has a structure corresponding to formula (I)

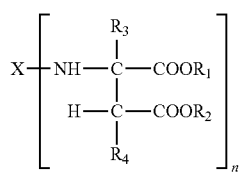

wherein:
n is an integer of at least 2,
X is a C3 or C4 polyether having a molecular weight ≥208,
$R_1$ and $R_2$ each independently represent organic groups that are inert to isocyanate groups under reaction conditions, and
$R_3$ and $R_4$ each independently represent hydrogen or organic groups that are inert to isocyanate groups under reaction conditions,
wherein the adhesive develops an acceptable bond strength to a substrate, defined as having a minimum of 150 g/in. measured @ 23° C. according to ASTM D 1876-01 or substrate tear, in less than five days after the substrate is laminated with the adhesive.

2. The multi-layered laminated film according to claim 1, wherein the adhesive develops an acceptable bond strength to a substrate, defined as having a minimum of 150 g/in. measured @ 23° C. according to ASTM D 1876-01 or substrate tear, in from one to five days after the substrate is laminated with the adhesive.

3. The multi-layered laminated film according to claim 1, wherein the adhesive develops an acceptable bond strength to a substrate, defined as having a minimum of 150 g/in. measured @ 23° C. according to ASTM D 1876-01 or substrate tear, in less than one day after the substrate is laminated with the adhesive.

4. The multi-layered laminated film according to claim 1, wherein the aliphatic polyisocyanate (A) is selected from the group consisting of 1,4-tetramethylene diisocyanate, 1,6-hexamethylene diisocyanate, 1,5-pentamethylene diisocyanate, 2,2,4- and/or 2,4,4-trimethyl-hexamethylene diisocyanate, dodecamethylene diisocyanate, 2-methyl-1,5-diisocyanatopentane, 1,4-diisocyanatocyclohexane, 5-isocyanato-1-(isocyanatomethyl)-1,3,3-trimethylcyclohexane, 2,4- and/or 4,4' diisocyanato-dicyclohexyl-methane, 1-isocyanato-1-methyl-3(4)-isocyanatomethyl-cyclohexane, 1,4-cyclohexane diisocyanate, and trimers, isocyanurates, uretdiones, biurets, allophanates, iminooxadiazine diones, carbodiimides, oxadiazine triones, and prepolymers of any of these, and mixtures thereof.

5. The multi-layered laminated film according to claim 1, wherein the polyamine (B1) has a molecular weight of from 240 and 6000.

6. The multi-layered laminated film according to claim 1, wherein the polyamine (B1) has a molecular weight of from 400 to 2000.

7. The multi-layered laminated film according to claim 1, wherein the Michael addition receptor (B2) is selected from the group consisting of dimethyl maleate, diethyl maleate, dibutyl maleate, dimethyl fumarate, diethyl fumarate, dibutyl fumarate, acrylates, and combinations thereof.

8. The multi-layered laminated film according to claim 1, wherein each layer independently has a thickness of from 5 μm to 250 μm, and wherein the multi-layered laminated film has a total thickness of from 20 μm to 750 μm.

9. The multi-layered laminated film according to claim 1, wherein the one or more substrate layers are independently selected from the group consisting of paper, metal and thermoplastic polymers.

10. The multi-layered laminated film according to claim 9, wherein the metal is selected from the group consisting of aluminum, copper, and steel.

11. The multi-layered laminated film according to claim 9, wherein the thermoplastic polymer is independently selected from the group consisting of polyethylene, corona-treated polyethylene, polyethylene terephthalate, corona-treated polyethylene terephthalate, metalized polyethylene terephthalate, polypropylene, and corona-treated polypropylene.

12. A flexible packaging material comprising the multi-layered laminated film according to claim 1.

\* \* \* \* \*